US011416430B2

United States Patent
Holzmann et al.

(10) Patent No.: US 11,416,430 B2
(45) Date of Patent: Aug. 16, 2022

(54) PORT MULTIPLIER AND RADIO COMMUNICATION TEST SYSTEM

(71) Applicant: Rohde & Schwarz GmbH & Co. KG, Munich (DE)

(72) Inventors: Gottfried Holzmann, Munich (DE); Martin Oetjen, Munich (DE); Matthias Jelen, Munich (DE); Albert Moser, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 240 days.

(21) Appl. No.: 16/780,685

(22) Filed: Feb. 3, 2020

(65) Prior Publication Data

US 2021/0240651 A1 Aug. 5, 2021

(51) Int. Cl.
*G06F 13/36* (2006.01)
*G06F 13/40* (2006.01)
*H04B 17/00* (2015.01)

(52) U.S. Cl.
CPC ...... *G06F 13/4027* (2013.01); *H04B 17/0085* (2013.01)

(58) Field of Classification Search
None
See application file for complete search history.

(56) References Cited

U.S. PATENT DOCUMENTS

| 4,453,031 | A  | * | 6/1984  | Justiss    | H01B 11/085  |
|           |    |   |         |            | 174/105 B    |
| 5,054,115 | A  | * | 10/1991 | Sawa       | H04B 1/3877  |
|           |    |   |         |            | 455/571      |
| 10,038,508| B1 | * | 7/2018  | Kerselaers | H04B 17/104  |
| 2002/0133765 | A1 | * | 9/2002 | Antosh   | G11C 29/48   |
|           |    |   |         |            | 714/718      |
| 2003/0207668 | A1 |   | 11/2003| McFarland et al. | |
| 2004/0246004 | A1 | * | 12/2004| Heuermann | G01R 35/005 |
|           |    |   |         |            | 324/601      |
| 2010/0052708 | A1 | * | 3/2010 | Ribeiro   | G01R 31/3025 |
|           |    |   |         |            | 324/756.01   |
| 2013/0321012 | A1 | * | 12/2013| Nath      | G01R 31/2808 |
|           |    |   |         |            | 324/750.02   |

FOREIGN PATENT DOCUMENTS

EP 1644804 B1 4/2006

* cited by examiner

*Primary Examiner* — Henry Tsai
*Assistant Examiner* — Dean Phan
(74) *Attorney, Agent, or Firm* — Christensen O'Connor Johnson Kindness PLLC

(57) ABSTRACT

A port multiplier for extending ports of a radio communication test instrument comprises an input for receiving at least one input signal, a power supply unit, a control logic, and at least one output for outputting a processed signal. The port multiplier is configured to split the at least one input signal into its different components such that a radio signal component of the input signal is forwarded to the at least one output. A power signal component of the input signal is forwarded to the power supply unit. Further, a control signal component of the input signal is forwarded to the control logic. Moreover, a radio communication test system for testing a device under test is described.

17 Claims, 1 Drawing Sheet

PORT MULTIPLIER AND RADIO COMMUNICATION TEST SYSTEM

FIELD OF THE DISCLOSURE

Embodiments of the present disclosure generally relate to a port multiplier for extending ports of a radio communication test instrument. Further, embodiments of the present disclosure generally relate to a radio communication test system for testing a device under test.

BACKGROUND

The testing of radio communication devices for mobile radio services has become more complex in the past, as the radio communication devices to be tested become more sophisticated. Accordingly, the number of radio frequency ports used for testing purposes has increased in order to satisfy the respective requirements for testing those devices. In fact, a radio communication test instrument used for performing the respective tests on the radio communication device, also called device under test, requires a higher number of communication ports via which the device under test can be connected with the radio communication test instrument for testing purposes. However, the space available at a front end of the test instrument is limited, as the test instrument is accommodated in a standardized rack defining the maximum available space for accommodating the test instrument.

Furthermore, the manufacturing costs of a test instrument increases with the number of communication ports, which results in high purchase costs for a test instrument satisfying the respective requirements. However, the high number of communication ports is not required for each test. Therefore, it is not reasonable to purchase a test instrument comprising such a high number of communication ports.

In order to overcome this issue, it is known to use external switching devices that are connected with the test instrument for increasing the number of ports. However, these external switching devices typically require an external power supply as well as external control lines, resulting in many cables and/or lines to be connected with the test instrument or other external devices for setting up the radio communication test system.

SUMMARY

Accordingly, there is a need for a cost-efficient and simple manner to extend ports of a radio communication test instrument for testing a radio communication device.

The present disclosure provides a port multiplier for extending ports of a radio communication test instrument. In an embodiment, the port multiplier comprises an input for receiving at least one input signal, a power supply, a control circuit or logic, and at least one output for outputting a processed signal. The port multiplier is configured to split the at least one input signal into its different components such that a radio signal component of the input signal is forwarded to the at least one output, a power signal component of the input signal is forwarded to the power supply, and a control signal component of the input signal is forwarded to the control circuit.

Further, embodiments of the present disclosure provide a radio communication test system for testing a device under test, wherein the test system comprises a radio communication test instrument with at least one communication port as well as a port multiplier with an input, a power supply, a control circuit or logic, and at least one output. The test instrument and the port multiplier are interconnected with each other by a multifunctional cable that is connected with a communication port of the test instrument and the input of the port multiplier.

Accordingly, a simple and flexible extension of the radio communication test instrument is provided, as the separately formed port multiplier can easily be connected with the test instrument by a single cable connection that is established by the multifunctional cable. The single cable connection ensures that all necessary signals are transmitted, namely the control signals (control signal component), the power signals (power signal component) as well as the radio frequency signals (radio signal component) used for testing the device under test, which might be connected with the at least one output of the port multiplier.

Accordingly, a very cost-efficient way is provided to extend the ports, as standardized radio communication test instruments can be used for testing.

Furthermore, the port multiplier can be manufactured in a cost-efficient manner, as the port multiplier only has one single external input, which receives all different signals or rather signal components. Hence, no other external input ports are required for receiving the control signals and/or the power signals, for instance. In some embodiments, all of these signals are transmitted to the port multiplier via the single input that is connected to the test instrument by the multifunctional cable.

In other words, the port multiplier has only a single input via which at least three different kinds of signal components are received. In some embodiments, the different signal components may be encompassed by a single input signal transmitted via the multifunctional cable, for instance by composite signal. Thus, the input signal may comprise signal portions with different frequencies, which are assigned to the different components. The multifunctional cable located between the port multiplier and the test instrument is configured to ensure that these different kinds of signal components, namely the signal portions with the different frequencies, can be transmitted via the single cable connection.

Accordingly, an inline control signal connection and/or an inline power signal connection is established in addition to the radio signal connection. In other words, the power supply is provided by the line that is used for transmitting the (radio frequency) signals for testing the device under test. Further, the control signals may also be transmitted via that line.

In general, the multifunctional cable ensures that a bulk load of cables or lines is avoided at the test site. Moreover, it is not necessary to alter the cable connection established between the radio communication test instrument and the device under test.

In some embodiments, less cables are necessary, as the respective signals, namely the control signals as well as the power signals, can be transmitted via the same cable connection established.

For instance, the control signals have a frequency that is lower than the radio frequency signals. The power signals may also have a frequency that is lower than the radio frequency signals. Moreover, the power signals may have a frequency that is also lower than the one of the control signals.

In general, the radio frequency signals or rather the radio signal components may relate to transmission signals and/or receiving signals. Accordingly, a bidirectional connection is established between the port multiplier and the radio communication test instrument.

In addition, another bidirectional connection may be established between the port multiplier and the device under test.

Therefore, transmission signals and/or receiving signals may be forwarded from the device under test via the port multiplier to the radio communication test instrument and vice versa.

An aspect provides that the port multiplier comprises a splitter connected with the input. The splitter is configured to split the input signal into its different components. The splitter may be connected directly with the input such that the input signal received from the test instrument is split internally in order to obtain the different signal components, which are forwarded to the respective components of the port multiplier, namely the power supply, the control logic as well as the at least one output. The splitter may be established by a radio frequency splitter that is enabled to split the input signal encompassing a radio frequency signal component, for example the different signal components having the different frequencies.

Furthermore, the port multiplier may have a plurality of outputs. Thus, at least two outputs may be provided such that two or more devices under test may be connected with the same port multiplier. Thus, the number of available communication ports of the entire system can be extended, as one communication port of the test instrument is assigned with at least two outputs of the port multiplier. Accordingly, at least one additional port is provided for connection a further device under test compared to directly connecting the device under test with the radio communication test instrument, namely the respective communication port.

The port multiplier may have a switch with at least two switching outputs. The switching outputs may be assigned to the outputs of the port multiplier. Hence, different devices under test can be tested in a subsequent manner depending on the position of the switch, for example the activated switching output(s).

In general, the switch may be configured to activate only one switching output at a time. This results in a point-to-point connection of the port multiplier, as the radio signal component used for testing the device under test is only forwarded to one output of the port multiplier and, thus, the respective device under test connected therewith can be tested. The switching position of the switch may be altered in order to establish another point-to-point connection with another device under test subsequently. No manual re-connecting is required for establishing these different signal paths.

Alternatively, the switch is configured to activate a plurality of switching outputs simultaneously. In some embodiments, all switching outputs are activated simultaneously. Thus, a multicast operation mode (several, but not all switching outputs are activated) or a broadcast operation mode (all switching outputs are activated) may be provided by the port multiplier, which depends on the activated switching outputs.

The switch may also be established by a radio frequency switch. In some embodiments, the switch has three switching outputs.

Further, the switch may be configured to perform an OSM measurement on a component connected with the input or the output of the port multiplier. The OSM measurement relates to the open, short, match measurements performed in order to characterize the respective component connected. Hence, the switch may have switching positions that relate to an open terminal, a short terminal and a match terminal in order to ensure the respective OSM measurements. For instance, the respective component may relate to a cable that is connected with the input or the output. Thus, the cable may be tested with respect to its respective characteristics. In some embodiments, the cable interconnected between the test instrument and the port multiplier is tested, as different cables with different attenuations may be used, for instance due to different cable lengths required for testing. Hence, all of these different cables may be characterized by the OSM measurements.

Another aspect provides that the input and the at least one output are assigned to an outer surface of a housing that encompasses the power supply and the control logic. Furthermore, the housing may also encompass the switch and/or the splitter. Thus, the port multiplier corresponds to a box, as all signal processing components of the port multiplier are located within the housing irrespective of the interfaces, namely the input and the at least one output.

According to another aspect, at least one power meter is provided that is assigned to the input or the output of the port multiplier. The power meter is configured to obtain a measurement value concerning the respective power at the input or the output. Thus, the power of the respective signal at the corresponding port, namely the input or the output, can be measured by the respective power meter. This information can be used for adapting the test procedure or modifying any test results.

In some embodiments, each port of the port multiplier comprises a power meter, namely the single input as well as all outputs of the port multiplier. This ensures that internal power losses within the port multiplier can be detected, for example power losses of the radio signal (component).

Further, the control logic may be connected with the power meter. The control logic is configured to convert the measurement value into a communication signal component. Thus, the information with regard to the power measured at the respective port, namely the input and/or the output(s), can be communicated from the port multiplier to the radio communication test instrument. For instance, the respective information is forwarded to the test instrument by a communication signal (component). The communication signal component may be encompassed by a signal forwarded from the port multiplier to the radio communication test instrument, wherein this signal also comprises a radio signal component from the device under test.

In any case, the respective information is transmitted via the multifunctional cable that is connected with the port multiplier and the test instrument. Thus, a bidirectional connection is established between the test instrument and the port multiplier by the multifunctional cable, as signal components like the control signal component, the power signal component, the radio signal component are forwarded in the first direction, whereas the communication signal component (and another radio signal component) is forwarded in the opposite direction.

Another aspect provides that the different components of the input signal do not interfere with each other in frequency. In some embodiments, different frequency ranges may be used for the different signal components. For instance, the control signal components and the power signal components each have a frequency that is lower than the radio signal components, for example the transmission and/or receiving signal components. This ensures that the respective signals do not interfere with each other.

For instance, the control signal components are assigned to a frequency range of 10 MHz to 100 MHz, whereas the path signal component are assigned to a frequency range up to 100 kHz. In addition, the radio signal components may be assigned to the gigahertz frequency range, for example 20 GHz, 28 GHz, 39 GHz and/or 66 GHz.

In general, the power signal component relates to a direct current.

An aspect provides that the multifunctional cable is configured to transmit a radio signal component, a power signal component, and a control signal component. Hence, the multifunctional cable is enabled to forward different kinds of information by the different signal components of the input signal.

The multifunctional cable may establish a bidirectional communication between the test instrument and the port multiplier. In some embodiments, signals might be forwarded form the test instrument to the port multiplier, for example the control signal components as well as the power signal components. Further, transmission signals are also forwarded from the test instrument to the port multiplier, wherein these transmission signals are forwarded to the at least one output for being forwarded to the device under test connected with the port multiplier.

In the reverse direction, the port multiplier is also configured to forward receiving signals originating from the respective device under test to the test instrument for testing purposes. In addition, communication signal components may be forwarded to the radio communication test instrument, which comprise information concerning any powers measured by the respective power meter(s).

Accordingly, a bidirectional communication is established between the port multiplier and the test instrument in order to ensure that the test signals, namely the radio frequency signals, can be forwarded in both directions.

For instance, the multifunctional cable is established by a coaxial cable or a hybrid cable. The hybrid cable may relate to a cable that encompasses different kinds of signal transmission lines. The coaxial cable ensures a substantially lossless transmission.

Furthermore, the port multiplier may be configured to communicate with the test instrument, thereby notifying the test instrument that the port multiplier is connected with the test instrument. Thus, the test instrument may configure itself in an appropriate manner, as it receives automatically the respective information that the port multiplier is connected with one of its communication ports. The test instrument may adapt its internal settings accordingly such that the different kinds of signals are transmitted via the single communication port toward the port multiplier connected with the radio communication test instrument.

Furthermore, several port multipliers may be provided that are interconnected with each other. Hence, at least two port multipliers may be connected with each other in a cascade manner. Thus, power signal components as well as control signal components may also be forwarded from the input to a respective output of the port multiplier such that a subsequent port multiplier connected with this output via its input is enabled to receive the respective power signal components as well as control signal components, which originate from the test instrument. In other words, the intermediate port multiplier(s) loops through the power signal components as well as control signal components in addition to the radio signal components.

Depending on the number of port multipliers and their arrangement, the number of available ports is further increased, which may be used for connecting devices under test.

According to another aspect, a device under test is provided that is connected with the at least one output. The device under test is tested by the test instrument, wherein the respective test signals, namely receiving signals and/or transmission signals, are exchanged between the test instrument and the device under test via the port multiplier interconnected.

The control signals or rather control signal components may be associated with a serial data protocol, namely a serial communication protocol.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
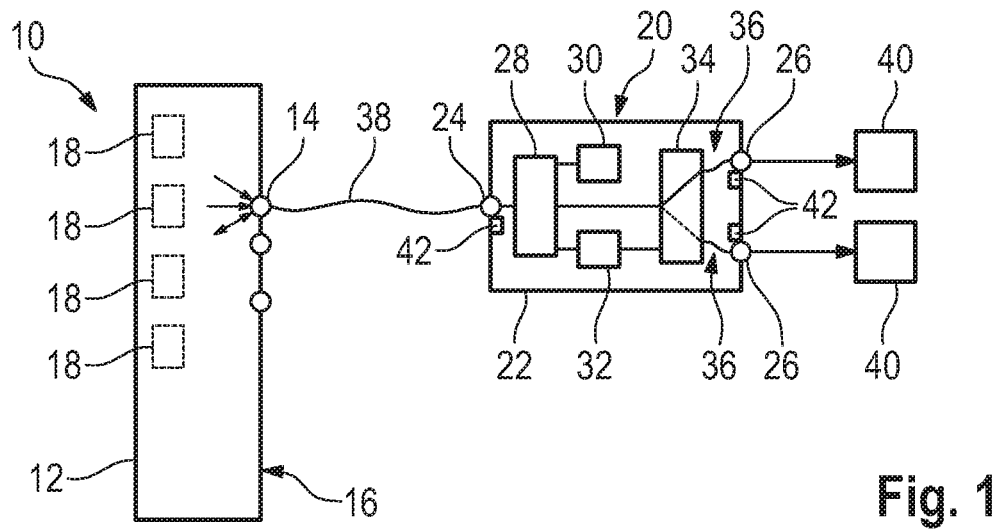
FIG. 1 shows a schematic overview of a representative radio communication test system according to an embodiment of the present disclosure, which comprises an example port multiplier according to the present disclosure.

In FIG. 1, a radio communication test system 10 is shown that comprises a radio communication test instrument 12 that has at least one communication port 14 located at a front end 16 of the radio communication test instrument 12. In the shown embodiment, the radio communication test instrument 12 has three different communication ports 14 that are located at the front end 16.

Further, the radio communication test instrument 12 has internal components 18 that are assigned to the communication ports 14. The internal components 18 may relate to a power supply, a signal transmitter, a signal receiver and/or a control and/or evaluation circuit or unit. Alternatively, the radio communication test instrument 12 may comprise a transmitter or a transceiver instead of the separately formed signal transmitter and signal receiver. All of these different internal components 18 may be connected with each of the communication ports 14 as will be described later.

In addition, the radio communication test system 10 comprises a port multiplier 20 that is connected with the radio communication test instrument 12. The port multiplier 20 comprises a housing 22 at which outer surface an input 24 as well as at least one output 26 are provided.

In the shown embodiment, the port multiplier 20 comprises two outputs 26. However, the port multiplier 20 may also have more than two outputs 26. In an embodiment, the port multiplier 20 comprises a splitter 28 assigned to the input 24 as well as a power supply 30, a control circuit logic 32 and a switch 34 assigned to the outputs 26. These components are encompassed by the housing 22 such that only the input 24 and the outputs 26 are accessible from the outside.

The switch 34 is assigned to the outputs 26. Thus, the switch 26 has two switching outputs 36 that are directly connected with the outputs 26 of the port multiplier 20 for establishing respective signal paths.

The port multiplier 20 is connected with the radio communication test instrument 12 via a multifunctional cable 38, wherein the multifunctional cable 38 is connected with the single input 24 of the port multiplier 20 and the communication port 14 of the test instrument 12 as shown in FIG. 1.

In some embodiments, the multifunctional cable 38 provides a bidirectional communication link between the port multiplier 20 and the test instrument 12 such that data/information can be exchanged in both directions between the port multiplier 20 and the test instrument 12.

Generally, the port multiplier 20 comprises only a single input established by the input 24 such that different kinds of signals are forwarded to the port multiplier 20 via the input 24.

In some embodiments, the radio communication test instrument 12 provides a power signal, for example a direct current, a control signal as well as a radio signal for testing purposes, wherein all of these signals are provided by the single communication port 14 with which the multifunctional cable 38 is connected.

In a first operation mode, a single input signal is transmitted via the multifunctional cable 38 towards the port multiplier 20 that encompasses the above-mentioned different signal components, namely a radio signal component, a power signal component as well as a control signal component.

The respective input signal is received by the port multiplier 20, for example via its input 24. The input signal received is forwarded internally to the splitter 28 that splits the input signal into its different signal components.

In some embodiments, the power signal component of the input signal is forwarded via the splitter 28 to the power supply 30 of the port multiplier 20 in order to supply the port multiplier 20 with the necessary power.

In addition, the control signal component is forwarded to the control logic 32 by the splitter 28, which processes the control signals internally.

Moreover, the radio signal component is forwarded to the switch 34, for example the respective outputs 26 assigned to the switch 34.

Accordingly, the different signal components encompassed in the input signal are split internally and directed to the respective internal components of the port multiplier 20. Hence, it is not necessary to establish several different cable connections between the test instrument 12 and the port multiplier 20 for ensuring proper operation, as the different types of signals are forwarded via the single cable connection established by the multifunctional cable 38.

The control logic 32 processes the control signals or rather the control signal components in order to control the switch 34 such that at least one of the outputs 26 is activated by providing a signal path with the corresponding switching output 36 of the switch 34.

Accordingly, a point-to-point connection may be established by the switch 34 while only activating one of its switching outputs 36 as well as the associated output 26.

However, the switch 34 may also be configured to activate several or all of its switching outputs 36 simultaneously in order to establish a multicast mode or rather a broadcast mode in which the radio signal component is forwarded to more than one outputs 26 simultaneously, for example all.

In addition, the radio communication test system 10 comprises two devices under test 40 that are connected with the respective outputs 26 of the port multiplier 20 as shown in FIG. 1.

The respective connections between the port multiplier 20 and the devices under test 40 may be established by cables or other communication lines, which ensure a bidirectional communication. Accordingly, signals may be forwarded from the port multiplier 20 towards the devices under test 40 and vice versa.

For instance, these connections may also be established by multifunctional cables.

In other words, the radio signals or rather the radio signal components exchanged may relate to transmission signals or receiving signals that originate from the test instrument 12 or from the devices under test 40.

This means that the radio signals or rather the radio signal components forwarded from the test instrument 12 to the device(s) under test 40 via the port multiplier 20 correspond to transmission signals, whereas the radio signals or rather the radio signal components forwarded from the device under test 40 to the test instrument 12 via the port multiplier 20 correspond to receiving signals.

In addition, the port multiplier 20 may comprise at least one power meter 42 that is assigned to one of its ports, namely the input 24 or the output(s) 26. In some embodiments, each of the ports comprises its own power meter 42.

Generally, it is ensured by the power meter(s) that the power of the signal processed at the respective port can be measured. In other words, the power meters 42 provide a measurement value of the signal processed at the respective port, namely the input 24 and/or the output(s) 26.

This information may be forwarded to the test instrument 12 for evaluation purposes by a communication signal component, which may be generated by the control logic 32.

Thus, the port multiplier 20 is generally configured to communicate with the test instrument 12 in order to forward respective information.

Further, the port multiplier 20 may be configured to notify the test instrument 12 that the port multiplier 20 is connected. This notification may also be communicated by means of the multifunctional cable 38.

The test instrument 12 is enabled to process the respective information such that certain signals, namely signals encompassing the radio signal components, the power signal components, as well as the control signal components, are outputted. In other words, the test instruments 12 configures itself appropriately.

Figure 3:
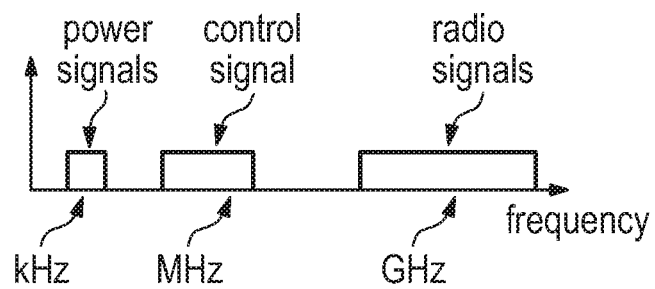
FIG. 3 shows a diagram illustrating an input signal used with different components.

Generally, the different signal components do not interfere with each other with respect to frequency, as they are assigned to different frequency ranges as shown in FIG. 3.

For instance, the control signal components are assigned to a frequency range of 10 MHz to 100 MHz, whereas the power signal component are assigned to a frequency range up to 100 kHz. In addition, the radio signal components may be assigned to the gigahertz frequency range, for example 20 GHz, 28 GHz, 39 GHz and/or 66 GHz.

Figure 2:
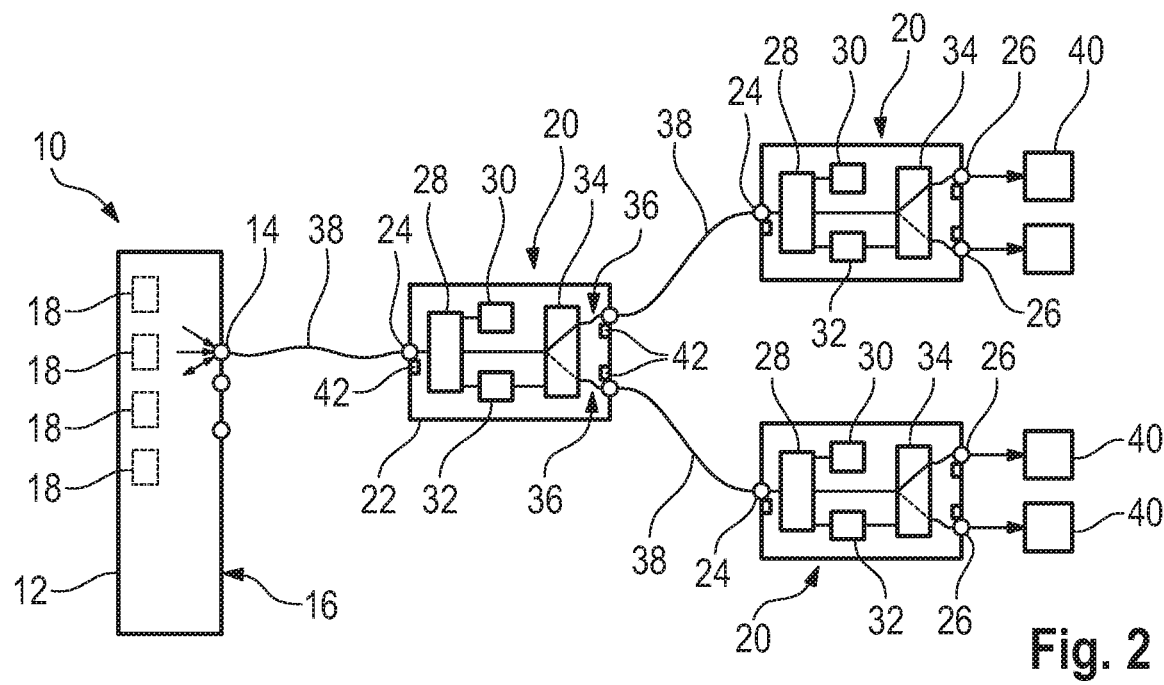
FIG. 2 shows a schematic overview of a representative radio communication test system according to an embodiment of the present disclosure.

In FIG. 2, another embodiment of the radio communication test system 10 is shown that comprises several port multipliers 20, that are interconnected with each other, namely in a cascade manner.

Multifunctional cables 38 may be used to interconnect the several port multipliers 20 with each other.

Thus, the outputs 26 of a first port multiplier 20 are connected with the inputs 24 of the other port multipliers 20. In some embodiments, the first port multiplier 20 corresponds to an intermediate port multiplier 20, as it is interconnected between the test instrument 12 and the other port multipliers 20.

The (intermediate) port multiplier 20 is generally configured to loop through the power signal components as well as control signal components received from the test instrument 12, for example in addition to the radio signal components.

Furthermore, the (intermediate) port multiplier 20 is also configured to loop through the signals received from the other port multipliers 20.

As shown in FIG. 2, four devices under test 40 are provided, which are connected to the outputs 26 of the port multipliers 20 located at the end of the cascade.

Hence, these four devices under test 40 are assigned to a single communication port 14 of the test instrument 12 due to the several port multipliers 20 interconnected with each other.

It is generally ensured that the number of ports used for connecting devices under test 14 with the test instrument 12 can be extended in a modular manner, wherein the efforts required for establishing the respective connections is reduced, as a single cable connection, namely the one established by the multifunctional cable 38, is sufficient for exchanging all necessary signals.

Certain embodiments disclosed herein utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A port multiplier for extending ports of a radio communication test instrument, said port multiplier comprising:
an input for receiving at least one input signal from the radio communication test instrument for testing a device under test,
a power supply,
a control circuit,
a housing that encompasses said power supply and said control circuit, and a plurality of outputs for outputting a processed signal for testing said device under test,
said input and said outputs being assigned to an outer surface of said housing,
said port multiplier being configured to split said at least one input signal into its different components such that a radio signal component of said input signal is forwarded to said outputs, a power signal component of said input signal is forwarded to said power supply, and a control signal component of said input signal is forwarded to said control circuit.

2. The port multiplier according to claim 1, wherein said port multiplier comprises a splitter connected with said input, said splitter being configured to split said input signal into its different components.

3. The port multiplier according to claim 1, wherein said port multiplier has a switch with at least two switching outputs.

4. The port multiplier according to claim 3, wherein said switch is configured to activate only one switching output at a time or to activate a plurality of switching outputs simultaneously.

5. The port multiplier according to claim 3, wherein said switch is configured to perform an OSM measurement on a component connected with said input or said output of the port multiplier.

6. The port multiplier according to claim 1, wherein at least one power meter is provided that is assigned to said input or said output of the port multiplier, said power meter being configured to obtain a measurement value concerning the respective power at said input or said output.

7. The port multiplier according to claim 6, wherein said control circuit is connected with said power meter, said control circuit being configured to convert said measurement value into a communication signal component.

8. The port multiplier according to claim 1, wherein said different components of said input signal do not interfere with each other in frequency.

9. A radio communication test system for testing a device under test, said test system comprising:
- a radio communication test instrument with at least one communication port;
- a device under test; and
- a port multiplier with an input, a power supply unit, a control logic, and at least one output,
- said test instrument and said port multiplier being interconnected with each other by a single cable connection that is established by a multifunctional cable that is connected with said communication port of said test instrument and said input of said port multiplier such that a single input signal is transmitted from said communication port of said test instrument via said multifunctional cable towards said input of said port multiplier, wherein said port multiplier is configured to split said at least one input signal into its different components such that a radio signal component of said input signal is forwarded to said at least one output, a power signal component of said input signal is forwarded to said power supply unit, and a control signal component of said input signal is forwarded to said control logic,
- said device under test being connected with said at least one output.

10. The radio communication test system according to claim 9, wherein said multifunctional cable is configured to transmit a radio signal component, a power signal component, and a control signal component.

11. The radio communication test system according to claim 9, wherein said port multiplier comprises at least one of a switch and a splitter configured to split said input signal into its different components.

12. The radio communication test system according to claim 9, wherein said multifunctional cable establishes a bidirectional communication between said test instrument and said port multiplier.

13. The radio communication test system according to claim 9, wherein said multifunctional cable is established by a coaxial cable or a hybrid cable.

14. The radio communication test system according to claim 9, wherein said port multiplier is configured to communicate with said test instrument, thereby notifying said test instrument that said port multiplier is connected with said test instrument.

15. The radio communication test system according to claim 9, wherein at least one power meter is provided that is assigned to said input or said output, said power meter being configured to obtain a measurement value concerning the respective power at said input or said output, said control logic being connected with said power meter, said control logic being configured to convert said measurement value into a communication signal component that is forwarded to said test instrument via said multifunctional cable.

16. The radio communication test system according to claim 9, wherein several port multipliers are provided that are interconnected with each other.

17. A port multiplier for extending ports of a radio communication test instrument, said port multiplier comprising:
- an input for receiving at least one input signal;
- a power supply;
- a control circuit;
- a switch with at least two switching outputs;
- a housing that encompasses said power supply, said control circuit, and said switch; and
- two outputs for outputting a processed signal respectively, said two outputs being connected with said at least two switching outputs,
- said port multiplier being configured to split said at least one input signal into its different components such that a radio signal component of said input signal is forwarded to said outputs, a power signal component of said input signal is forwarded to said power supply, and a control signal component of said input signal is forwarded to said control circuit,
- said switch being configured to activate a plurality of switching outputs simultaneously such that a multicast operation mode or a broadcast operation mode is provided by the port multiplier.

* * * * *